US010684734B2

(12) United States Patent
Kleiman-Schwarsctein et al.

(10) Patent No.: US 10,684,734 B2
(45) Date of Patent: Jun. 16, 2020

(54) TRANSPARENT HIGH-RESISTIVITY LAYER FOR ELECTROSTATIC FRICTION MODULATION OVER A CAPACITIVE INPUT SENSOR

(71) Applicant: Apple Inc., Cupertino, CA (US)

(72) Inventors: Alan Kleiman-Schwarsctein, Santa Clara, CA (US); Senem E. Emgin, Mountain View, CA (US); Terrence L. Van Ausdall, Boulder Creek, CA (US); Xianwei Zhao, Fremont, CA (US); Yuxi Zhao, San Jose, CA (US); Soyoung Kim, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/143,382

(22) Filed: Sep. 26, 2018

(65) Prior Publication Data

US 2019/0095009 A1 Mar. 28, 2019

Related U.S. Application Data

(60) Provisional application No. 62/564,941, filed on Sep. 28, 2017.

(51) Int. Cl.
*G06F 3/044* (2006.01)
*G06F 3/041* (2006.01)
*G06F 3/01* (2006.01)

(52) U.S. Cl.
CPC .............. *G06F 3/044* (2013.01); *G06F 3/016* (2013.01); *G06F 3/0416* (2013.01); *G06F 2203/04103* (2013.01)

(58) Field of Classification Search
CPC ........ G06F 3/016; G06F 3/044; G06F 3/0416; G06F 3/041; G06F 3/0412
See application file for complete search history.

(56) References Cited

U.S. PATENT DOCUMENTS

| 6,998,926 | B2 | 2/2006 | Miyazaki et al. | |
|---|---|---|---|---|
| 7,663,604 | B2 | 2/2010 | Maruyama et al. | |
| 9,235,265 | B2 | 1/2016 | Karamath et al. | |
| 2013/0087374 | A1* | 4/2013 | Nah | G06F 3/044 174/258 |
| 2013/0307789 | A1* | 11/2013 | Karamath | G06F 3/016 345/173 |
| 2014/0168150 | A1* | 6/2014 | Kim | G02F 1/136204 345/174 |

(Continued)

OTHER PUBLICATIONS

U.S. Appl. No. 16/286,433, filed Feb. 26, 2019, Salada.

*Primary Examiner* — Dong Hui Liang
(74) *Attorney, Agent, or Firm* — Brownstein Hyatt Farber Schreck, LLP

(57) ABSTRACT

A transparent high-conductivity layer for providing electrostatic feedback to a user of an electronic device. The transparent high-conductivity layer is positioned over a capacitive input sensor and has a resistivity sufficiently high to prevent interference with the capacitive input sensor. As one example, the transparent high-conductivity layer can be formed from a layer of geometrically-separated regions of high-conductivity material. The average distance between geometrically-separated regions can substantially define the resistivity of the transparent high-conductivity layer.

9 Claims, 12 Drawing Sheets

(56) References Cited

U.S. PATENT DOCUMENTS

| | | | |
|---|---|---|---|
| 2014/0313160 A1* | 10/2014 | Ciou | G06F 3/044 |
| | | | 345/174 |
| 2014/0339521 A1* | 11/2014 | Ozawa | H01L 51/5228 |
| | | | 257/40 |
| 2015/0220197 A1 | 8/2015 | Algreatly | |
| 2016/0370862 A1 | 12/2016 | Colgate et al. | |
| 2017/0060239 A1 | 3/2017 | Lim et al. | |
| 2018/0369866 A1 | 12/2018 | Sammoura et al. | |
| 2019/0042046 A1 | 2/2019 | Filiz et al. | |
| 2019/0050080 A1 | 2/2019 | Bagheri et al. | |
| 2019/0056837 A1 | 2/2019 | Datta et al. | |

* cited by examiner

TRANSPARENT HIGH-RESISTIVITY LAYER FOR ELECTROSTATIC FRICTION MODULATION OVER A CAPACITIVE INPUT SENSOR

CROSS-REFERENCE TO RELATED APPLICATION

This application is a non-provisional patent application of, and claims the benefit to, U.S. Provisional Patent Application No. 62/564,941, filed Sep. 28, 2017, and titled "Transparent High-Resistivity Layer for Electrostatic Friction Modulation over a Capacitive Input Sensor," the disclosure of which is hereby incorporated herein by reference in its entirety.

FIELD

Embodiments described herein relate to capacitive input sensors, and in particular, to capacitive input sensor stacks that incorporate a transparent high-resistivity layer suitable for electrostatic friction modulation.

BACKGROUND

An electronic device can include a capacitive input sensor positioned below a surface to detect touch or force input to that surface. Conventionally, a capacitive input sensor is positioned below an outer layer (e.g., glass, sapphire, and so on) that defines the input surface.

In some cases, it may be desirable to position a conductive layer above the capacitive input sensor and below the protective dielectric layer. In many cases, however, the conductive layer interferes with the operation of the capacitive input sensor and, additionally or alternatively, undesirably changes the appearance of the electronic device.

SUMMARY

Embodiments described herein generally relate to electronic devices incorporating a transparent high-resistivity layer for electrostatic friction modulation. In particular, the transparent high-resistivity layer is disposed over a capacitive input sensor that, in turn, is disposed over a display. The transparent high-resistivity layer is capacitively coupled to the capacitive input sensor such that ground-shifting of the capacitive input sensor drives the transparent high-resistivity layer to a voltage sufficient for electrostatic friction modulation.

The transparent high-resistivity layer can be formed in a number of ways including, but not limited to, defining a number of geometrically-separated regions of high-conductivity material spaced sufficiently close to enable charge carrier hopping between regions.

BRIEF DESCRIPTION OF THE FIGURES

Reference will now be made to representative embodiments illustrated in the accompanying figures. It should be understood that the following descriptions are not intended to limit the disclosure to a finite set of preferred embodiments. To the contrary, it is intended that the following description covers alternatives, modifications, and equivalents as may be included within the scope of the described or depicted embodiments and as defined by the appended claims.

The use of the same or similar reference numerals in different figures indicates similar, related, or identical items.

Figure 1A:
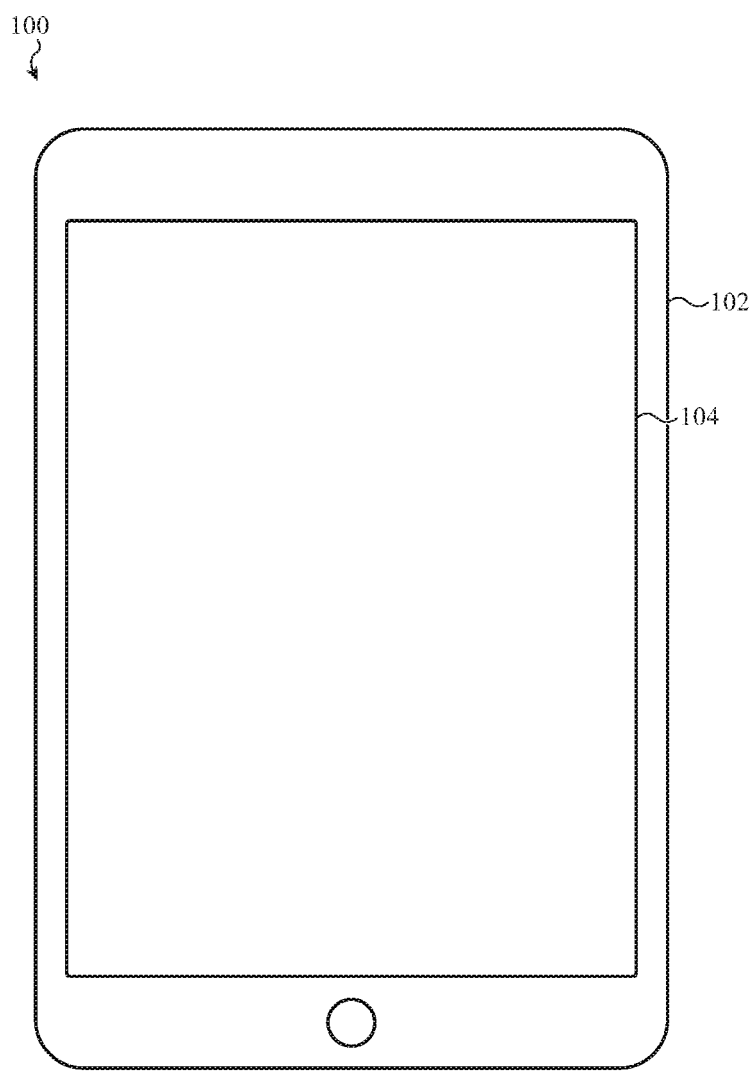
FIG. 1A depicts an electronic device including a transparent high-resistivity layer disposed over a display.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an electronic device, such as a tablet or smart phone, that includes a high-resistivity layer disposed over a capacitive input sensor disposed, in turn, over a display. The electronic device is configured to drive the high-resistivity layer—either capacitively or conductively—with a suitable high-voltage alternating current signal to modulate perceived friction via electrostatic attraction between an exterior surface of the electronic device (herein, the "interface surface") and a user touching that surface. As a result of this construction, the user can directly interact with contact shown on the display, while receiving localized (or generalized) output in the form of a perceivable variation in friction across the interface surface.

A high-resistivity layer, such as described herein, can be formed in a number of ways to exhibit any selected resistivity and any selected optical characteristic, including optical transparency (e.g., high total transmittance) suitable for positioning over, but not obscuring, a display. For embodiments described herein, the resistivity of a high-resistivity layer is typically selected such that the layer does not substantially interfere with the operation of a capacitive input sensor positioned below it. In addition, the total transmittance of a high-resistivity layer is typically selected such that the layer does not substantially obscure, distort, or otherwise interfere with a display positioned below it. More specifically, a "transparent" layer, such as described herein, may be characterized by a high percentage transmittance of light (e.g., 50%-100% transmittance) in a traditionally visible spectrum (e.g., between 300 nm and 700 nm wavelengths). In many cases, a layer such as described herein can exhibit a transmittance greater than eighty percent.

As such, for simplicity of description, high-resistivity layers described herein are referred to as "transparent high-resistivity layers." It is appreciated, however, that a high-resistivity layer in certain embodiments need not be optically transparent, and can be opaque or translucent, or may be doped or coated with a pigment to exhibit a particular color, image, or pattern.

As noted above, a transparent high-resistivity layer, such as described herein, can be formed in a number of ways. For example, a transparent high-resistivity layer can be formed from a conductive material having a suitable resistivity and a suitable transmittance (e.g., metal oxide) disposed to a suitable thickness. More particularly, the conductive material is disposed to a selected thickness such that the layer exhibits both high transmittance (e.g., a total transmittance such as 50%, 75%, 90%, and so on) and high resistivity (e.g., a sheet resistance such as 500 k$\Omega$/sq, 1M$\Omega$/sq, 5M$\Omega$/sq, 10M$\Omega$/sq, 20M$\Omega$/sq). In this construction, the thickness of the conductive material layer may substantially define both the transmittance and the resistivity of the layer; modifying the thickness of the layer—which may be substantially continuous or variable across the surface of the layer—can serve to either increase or decrease the transmittance and/or resistivity. Different embodiments may be implemented with conductive layers of different thicknesses.

In another example, a transparent high-resistivity layer can include a number of geometrically-separated regions of transparent high-conductivity material, such as indium-tin oxide. The distance between individual regions of the high-conductivity material is typically small in order to facilitate charge carrier hopping from region to region. As a result of this construction, the average distance between individual regions of high-conductivity material can be correlated to resistivity of the layer. For example, the greater the average distance between regions, the more the resistivity of the layer increases.

In some embodiments, all regions of high-conductivity material defining a transparent high-resistivity layer can be formed to take substantially the same shape and can be formed to substantially the same thickness. In other embodiments, different regions are formed to different thicknesses and/or different shapes. In some embodiments, multiple sublayers of regions of high-conductivity material can be layered on one another.

In still further embodiments, a substantially continuous layer of doped high-conductivity material can be used to form a high-resistivity layer. For example, a doped layer of indium-tin oxide (or another metal oxide) can be used. Doping concentrations and dopant locations can change from embodiment to embodiment. For example, in some embodiments, a high dopant concentration corresponds to a higher resistance than a low dopant concentration. In other examples, a dopant gradient can be defined through a thickness of the layer. More particularly, local concentration of dopant material may increase or decrease as a function of depth into the thickness of the high-conductivity material.

The foregoing example constructions of a transparent high-resistivity layer are not exhaustive. It may be appreciated that in further embodiments, other configurations (e.g., multilayer, single layer, doping gradients, doping profiles, and so on) and materials (e.g., silicon oxides, aluminum oxides, zinc oxides, tin oxides, doped tin oxide, Iridium doped tin oxide, doped indium oxide, titanium oxides, nitrides, oxynitrides, sulfides, substoichiometric oxides, nitrides or oxynitrides; mixed metal oxides, doped oxides, inorganic perovskites, cation or anion deficient metal oxides, nitrides, oxynitrides or sulfides; metal nanoparticles or metal impurities in an oxide structure, and so on) are possible. For example, in an embodiment, silicon dioxide can be combined with tin dioxide (e.g., $SiO_{2+}SnO_2$).

More generally, independent of construction, a transparent high-resistivity layer is typically disposed above a capacitive input sensor which, in turn, is disposed above a display of an electronic device. The electronic device is configured to drive the transparent high-resistivity layer with a high voltage signal in order to increase perceived friction between the user's finger and the interface surface above (or defined by) the transparent high-resistivity layer.

Typically, a separator layer conductively isolates the transparent high-resistivity layer from the capacitive input sensor. The separator layer can be a single layer of dielectric material (e.g., glass, adhesive, polymer, and so on) or more than one sublayers of dielectric material. In some embodiments, the separator layer can include one or more circuits or circuit traces, such as thin-film transistor circuits. Example capacitive input sensors include, but are not limited to, capacitive touch input sensors (e.g., projected capacitance, single-touch, multi-touch, mutual capacitance, self-capacitance, and so on) and capacitive force sensors (e.g., gap-based compression sensors, capacitive strain sensors, single-force, multi-force, binary force, variable force, and so on).

The electronic device can drive the transparent high-resistivity layer using any suitable technique. For example, in one embodiment, a processor of the electronic device is conductively coupled to the transparent high-resistivity layer and is configured apply a high-voltage drive signal to the transparent high-resistivity layer (e.g., 600 Vpp, 500 Vpp, 400 Vpp, and so on).

In another embodiment, a processor of the electronic device is capacitively coupled to the transparent high-resistivity layer via the capacitive input sensor. In this embodiment, the electronic device is configured to ground-shift the capacitive input sensor according to a high-voltage drive signal. In other words, the electronic device supplies a signal-modulated local ground and a signal-modulated local source to the sensor with a constant direct current offset between the local ground and the local source.

As a result of this construction, the capacitive input sensor operates across the constant direct current offset and the alternating current components of the high-voltage drive signal are capacitively coupled into the transparent high-resistivity layer. As a result of the capacitive coupling between the transparent high-resistivity and the capacitive input sensor, the user may perceive increased friction due to electrostatic attraction. In other words, the user may perceive certain regions of the interface surface as having different friction than other regions. Certain regions may be perceived to be high friction regions whereas other regions may be perceived to be low friction regions.

These and other embodiments are discussed below with reference to FIGS. 1A-9. However, those skilled in the art will readily appreciate that the detailed description given herein with respect to these figures is for explanatory purposes only and should not be construed as limiting.

Figure 1B:
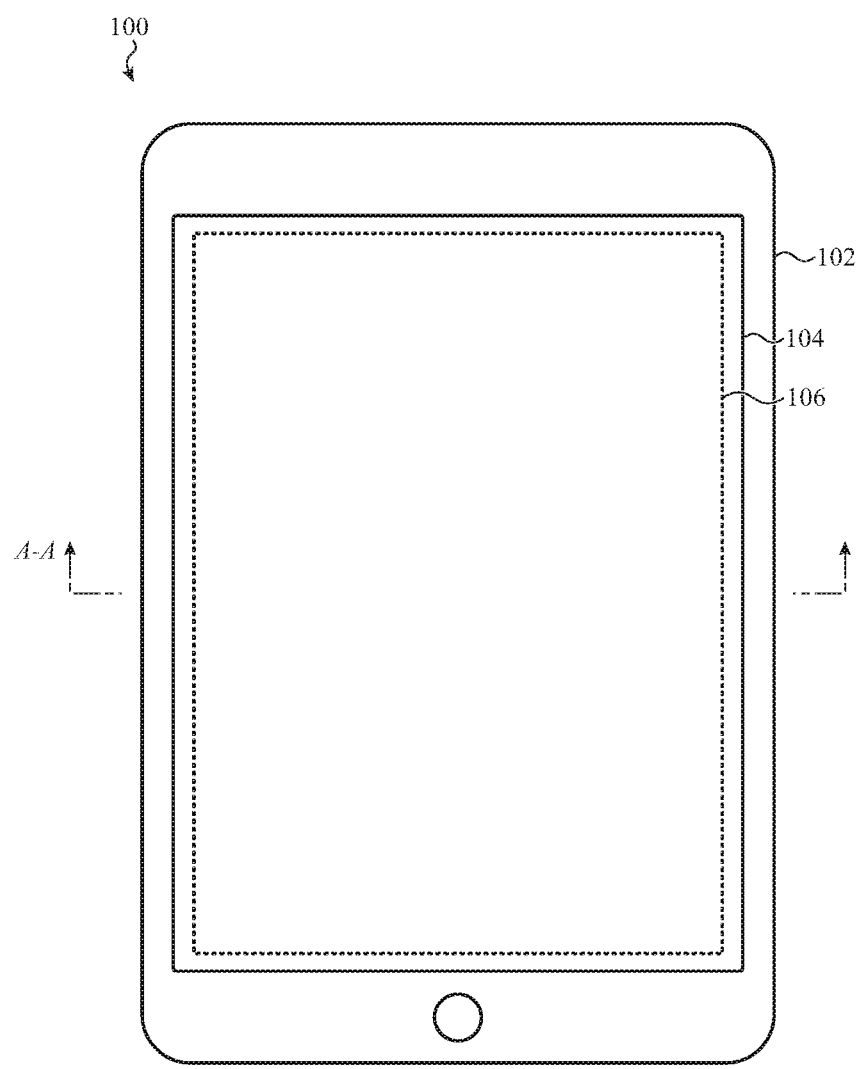
FIG. 1B depicts a plan view of the electronic device of FIG. 1A, depicting the transparent high-resistivity layer in phantom.

Generally and broadly, FIGS. 1A-1B depict an electronic device 100 that incorporates a transparent high-resistivity layer (see, e.g., FIG. 1B) positioned relative to an interface surface that may be touched by a user. The interface surface of the electronic device 100 is defined by a housing 102 that encloses, below the interface surface, a display 104 and a capacitive input sensor (not shown). The transparent high-resistivity layer 106 is shown in phantom in FIG. 1B.

In the illustrated embodiment, the electronic device 100 is depicted as a tablet computer, although this may not be required of all embodiments and the electronic device can take other forms such as, but not limited to: cellular phones; multi-screen tablet computers; desktop computers; wearable electronic devices; peripheral input devices; console control systems; industrial control devices; medical devices; diagnostic devices; vehicle or aeronautical control or entertainment systems; and so on.

As noted above, the display 104 is within the housing 102 and positioned behind the interface surface. The display 104 may include, or can be assembled from, a stack of multiple layers or elements including, for example, a display element, a touch sensor layer, a force sensor layer, a color filter layer, a polarizer layer, an anode layer, a cathode layer, an encapsulation layer, and other elements or layers. The display 104 may include a liquid-crystal display element, organic light emitting diode element, electroluminescent display, and the like. The display 104 may also include other layers for improving the structural or optical performance of the display, including, for example, glass sheets, polymer sheets, polarizer sheets, adhesive layers, color masks, and the like. The display 104 can be integrated into or incorporated with a cover that at least partially defines the interface surface of the electronic device 100. In many examples, the cover is formed from glass or another suitable material such as plastic, sapphire, ion-implanted glass, and so on. In some cases, the cover is a solid material whereas in other cases the cover is formed by laminating or adhering several sublayers of material together. In some embodiments, the cover can be coated with an antireflective and/or oleophobic coating.

The input sensor of the electronic device 100 can be configured to detect various capacitances associated with combinations of user touch and/or force input on the interface surface. More particularly, the input sensor can be configured to detect the location of a touch, a magnitude and/or direction of a force exerted, and/or a movement of a touch or a force input on the interface surface. In some examples, the input sensor can be configured to detect more than one touch input and/or more than one force input simultaneously. Additionally, the input sensor can be used separately or in combination with other sensors or systems of the electronic device 100 to detect and/or interpret a broad range of user inputs such as, but not limited to, touch-based gestures, force-based gestures, touch patterns, tap patterns, single-finger gestures, multi-finger gestures, multi-force gestures, and so on.

The input sensor can be implemented in any number of suitable ways with any suitable capacitive sensing technology or combination of technologies including, but not limited to, self-capacitance touch-sensing, mutual capacitance touch-sensing, capacitive force sensing, and so on, or any combination thereof.

Some embodiments include multiple input sensors. The input sensors can be independently addressable and may be distributed and/or segmented across the display 104. In other embodiments, the input sensors may be disposed relative to a perimeter of the display 104. In such embodiments, the input sensors may be disposed below an opaque or translucent bezel surrounding the display 104. The bezel can take any suitable shape and is not limited to a single color, location, translucency, or transparency. In some cases, the bezel can wrap around one or more sidewalls or edges of the housing 102. In some cases, the bezel can selectively obscure a secondary display, a biometric sensor, an imaging sensor, an input sensor, a button, and so on.

As noted above, in many embodiments, the input sensor can be ground-shifted and capacitively coupled to the transparent high-resistivity layer 106. In this manner, the electronic device 100 can drive the transparent high-resistivity layer 106 to a high voltage in order to electrostatically attract the user's finger, inducing a perceivable friction between the user and the interface surface.

More generally, as a result of this arrangement, the electronic device 100 can provide output in the form of variable friction to the user, via the transparent high-resistivity layer 106, when the user touches and/or applies a purposeful force to the interface surface. The output may be localized to a particular region of the interface surface, or may be provided across the entire interface surface.

In some cases, more than one output may be provided at the same time. If the user touches a first location of the interface surface above the display 104, the user may perceive a first output. If the user touches a second location of the display 104, the user may perceive a second output. If the user drags a finger from the first location to the second location, the user may perceive a transition, which may be abrupt or gradual, between the first output and the second output. In further embodiments, a boundary or border between the first location and the second location may be associated with yet a third output.

The foregoing description of the embodiment depicted in FIGS. 1A-1B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of an electronic device incorporating a transparent high-resistivity layer are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2A:
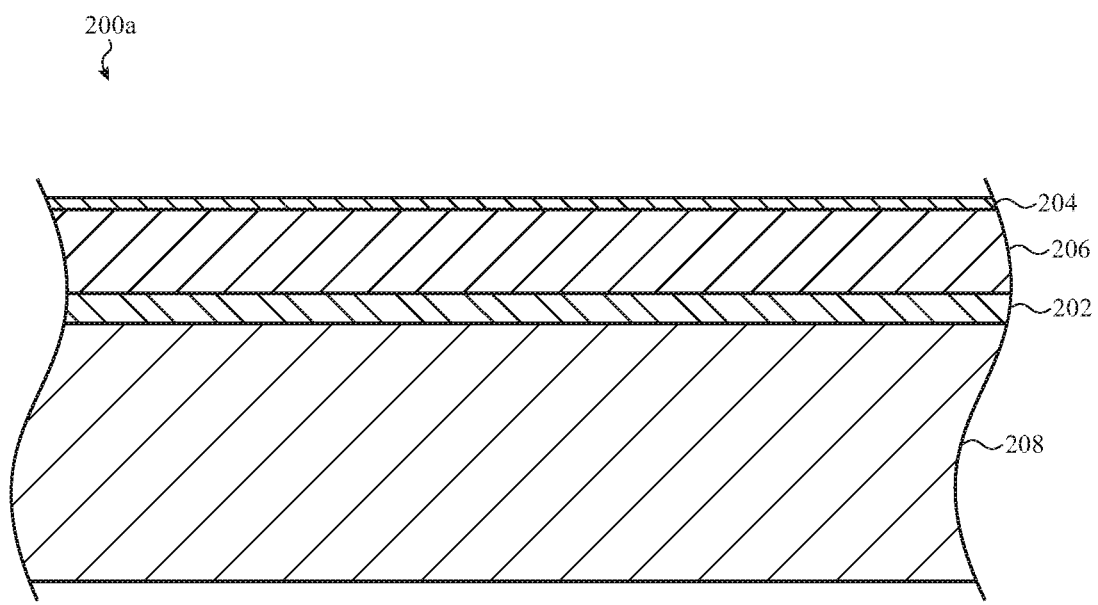
FIG. 2A depicts a cross-section of the transparent high-resistivity layer of FIG. 1B, taken through line A-A.
Figure 2B:
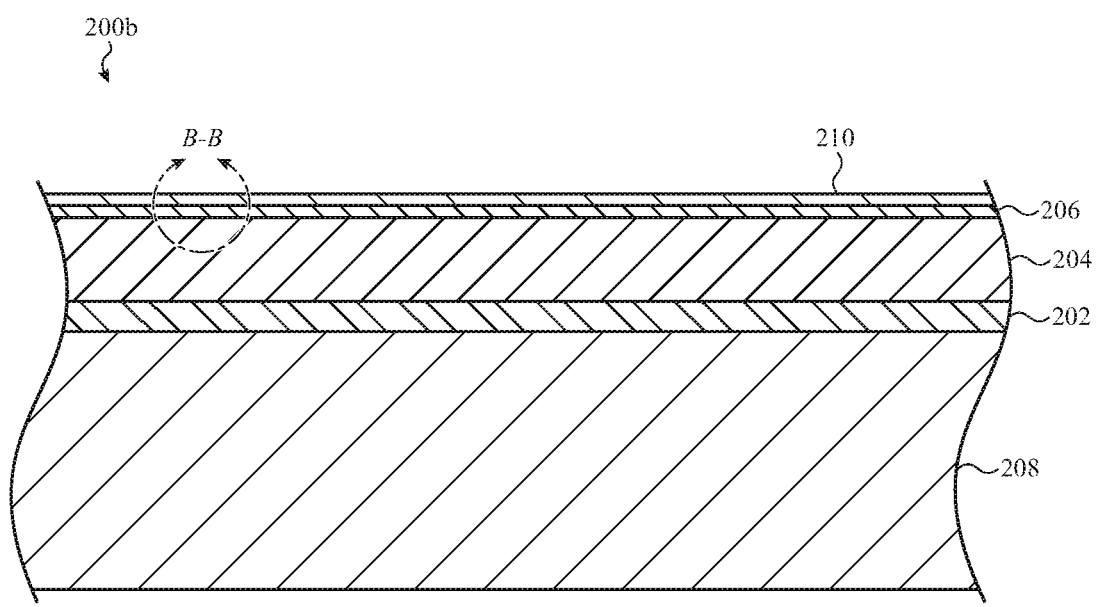
FIG. 2B depicts another example cross-section of a transparent high-resistivity layer, particularly illustrating an anti-reflective coating disposed over the transparent high-resistivity layer.

Generally and broadly, FIGS. 2A-2B depict cross-sections of the transparent high-resistivity layer of FIG. 1B, such as described herein.

FIG. 2A depicts a cross-section 200a that includes a transparent high-resistivity layer, such as depicted in FIG. 1B through section A-A. The cross-section 200a depicts a stack of layers, each of which may be formed from one or more materials and may be conductive, dielectric, or semiconductive. More specifically, the cross-section 200a includes a capacitive input sensor 202 separated from a transparent high-resistivity layer 204 by a dielectric layer 206 formed from one or more layers of material such as, but not limited to: glass; acrylic; sapphire; ceramic; polymers; organic materials; and so on. The capacitive input sensor 202, the dielectric layer 206, and the transparent high-resistivity layer 204 are each optically transparent and are disposed over a display 208. In this example, the transparent high-resistivity layer 206 is capacitively coupled to the capacitive input sensor 202, which—in one embodiment—can be ground-shifted in order to capacitively drive the transparent high-resistivity layer 206 with a high voltage signal.

In further embodiments, such as illustrated in the cross-section 200b depicted in FIG. 2B, the transparent high-resistivity layer 204 can accommodate (e.g., chemically or mechanically bond to) an outer layer 210. In some embodiments, the outer layer 210 is a passivation layer that protects the transparent high-resistivity layer 204 from oxidation damage. In other cases, the outer layer 210 is an encapsulation layer that protects the transparent high-resistivity layer 204 from environmental or impact damage. In still other cases, the outer layer 210 is an antireflective layer that improves the performance and/or appearance of the display 208. In other cases, the outer layer 210 is an oleophobic or hydrophobic layer. In some embodiments, the outer layer 210 can perform more than one function.

In typical examples, the various layers of the stack depicted in the cross-section 200a and the cross-section 200b are chemically adhered to one another and/or with one or more layers of optically clear adhesive. In other cases, the various layers of the stack depicted in the cross-section 200a and/or the cross-section 200b are laminated together. In still further examples, the various layers of the stack depicted in the cross-section 200a and/or the cross-section 200b are mechanically fastened to one another using a suitable technique such as, but not limited to: laser welding; sonic welding; a perimeter ring or frame; mechanical fasteners; clamps; and so on or any combination thereof.

The transparent high-resistivity layer 204 can be formed from any number of materials or combination of materials. Several example constructions are provided herein, but it may be appreciated that these examples are not exhaustive and that a high-resistivity layer can be constructed, shaped, disposed, formed, or otherwise structured in any number of suitable and/or implementation-specific ways.

For example, in one embodiment, the transparent high-resistivity layer 206 is formed from a number or cluster of geometrically-separated regions of high-conductivity material (see, e.g., FIGS. 3A-4C), such as a transparent metal oxide. The geometrically-separated regions of high-conductivity material can be formed in a number of suitable ways including, but not limited to: deposition; mask and etch; laser etching; chemical etching; mechanical etching; vapor deposition, sputtering, metasputtering, reactive sputtering, thermal ablation, e-beam evaporation, printing, gravure, roll-to-roll deposition; and so on or any combination thereof. In this construction, the separation and uniformity of the geometrically-separated regions of high-conductivity material can define the resistivity and transmittance of the high-resistivity layer 206.

Figure 5A:
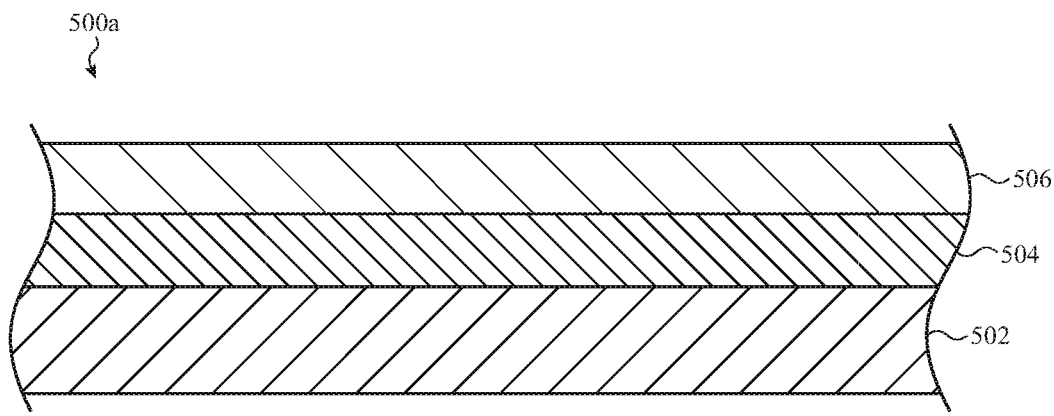
FIG. 5A depicts a cross-section view of a transparent high-resistivity layer formed from a substantially continuous layer of high-conductivity material having a selected impurity/doping concentration.
Figure 5B:
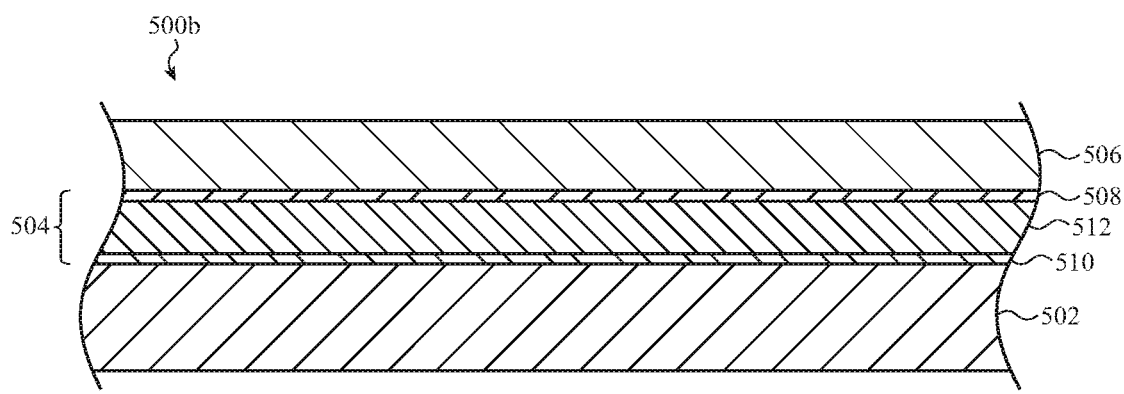
FIG. 5B depicts a cross-section view of a transparent high-resistivity layer formed from multiple layers of high-conductivity material, each having a selected impurity/doping concentration.
Figure 5C:
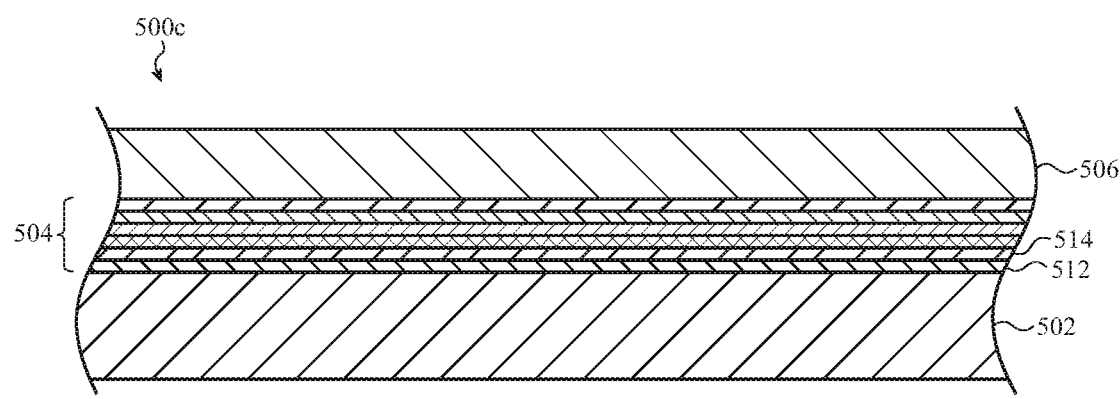
FIG. 5C depicts a cross-section view of another transparent high-resistivity layer formed from multiple layers of high-conductivity material, each having a selected impurity/doping concentration.

In further embodiments, the transparent high-resistivity layer 206 is formed from multiple sublayers of material, some of which may have high resistivity and some of which may have low resistivity (see, e.g., FIGS. 5A-5C). In this construction, the conductivity and transmittance of the various sublayers can define the resistivity and transmittance of the high-resistivity layer 206.

In still further embodiments, the transparent high-resistivity layer 206 is formed from a doped transparent conductive metal oxide (see, e.g., FIGS. 6A-6D) using a suitable technique such as, but not limited to, vapor deposition, printing, gravure, roll-to-roll deposition, and so on. Example metal oxides include but are not limited to: indium oxides, gallium oxides, aluminum oxides, titanium oxides, zinc alloy oxides; zinc-doped tin oxide; indium-tin alloy oxides; and so on, or any combination thereof. In this construction, dopant concentrations—whether local, global, gradient, or depth-dependent—can define the resistivity and transmittance of the transparent high-resistivity layer 206.

Independent of a selected construction, and as noted above, the transparent high-resistivity layer 204 typically has a sheet resistance of 500 kΩ/sq, 5MΩ/sq, 5MΩ/sq, 10MΩ/sq, 20MΩ/sq, or higher. Also as noted above, a higher sheet resistance may be selected so that the transparent high-resistivity layer 204 does not substantially interfere with the operation of the capacitive input sensor 202.

As noted with respect to other embodiments described herein, in some examples, the capacitive input sensor 202 is a touch input sensor configured to measure for changes in capacitance between a first set of electrodes (not shown) and a second set of electrodes (not shown) that may result from the proximity of a user's finger or another input object, such as a stylus. The capacitive input sensor 202 can operate as a single-touch or multi-touch input sensor.

In other embodiments, the capacitive input sensor 202 is a force input sensor configured to measure for changes in capacitance between a first set of electrodes and a second set of electrodes that may result from compression of the dielectric layer 206. For example, the dielectric layer 206 can be formed from an elastic material or may include a compressible air gap.

In still further examples, the capacitive input sensor 202 may be a combined sensor in which a first set of electrodes are configured to detect touch input via projected capacitance and a second set of electrodes are configured to detect force input via strain-based resistance, inductance, charge, or capacitances measurements. In this manner, changes in an electrical property of a first set of electrodes and/or a second set of electrodes can be correlated to a magnitude of force applied by a user to the interface surface.

The foregoing description of the embodiment depicted in FIGS. 2A-2B, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of a stack of layers including a transparent high-resistivity layer are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Generally and broadly, FIGS. 3A-3F depict various detail views of example cross-sections of a transparent high-resistivity layer, such as depicted in FIG. 2B in the enclosed circle B-B. In general, these embodiments depict a transparent high-resistivity formed from a number or cluster of geometrically-separated regions of high-conductivity material. As noted above, the distance between individual regions of the high-conductivity material is typically small in order to facilitate charge carrier hopping from region to region, facilitating conduction across the layer. As a result of this construction, the average distance between individual regions of high-conductivity material can be correlated to resistivity of the layer. For example, the greater the average distance between regions, the more the resistivity of the layer increases. In some examples, the separation between individual regions maybe on the order of 1-5 nm.

Figure 3A:
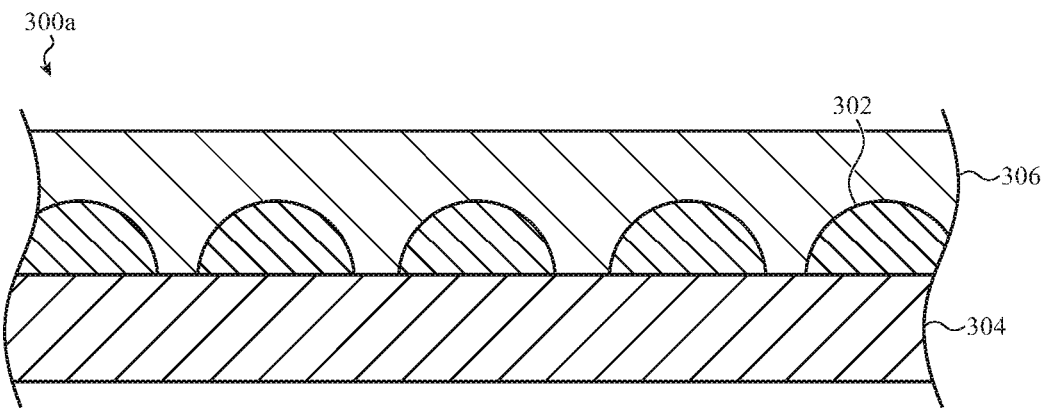
FIG. 3A depicts a detail view of the enclosed circle B-B of the transparent high-resistivity layer of FIG. 1B, specifically showing a cluster of geometrically-separated regions of high-conductivity material.

In particular, FIG. 3A depicts a detail view 300a of a transparent high-resistivity layer defined by a cluster of geometrically-separated regions of high-conductivity material, one of which is identified as the region 302. As with the embodiment described in reference to FIGS. 2A-2B, the region 302 can be disposed onto, formed onto, or otherwise attached to a dielectric layer 304.

The region 302—along with the other geometrically-separated regions of high-conductivity and optically transparent material—can be formed in a number of suitable ways from a number of suitable materials or combinations of materials. In one embodiment, the region 302 is formed entirely from a transparent metal oxide, such as indium tin oxide. In another embodiment, the region 302 is formed from a low-conductivity material, such as aluminum oxide, that is doped with a high-conductivity material, such as indium tin oxide. In other cases, the region 302 is formed from a cured sol of conductive material, such as a profusion of metal nanowires suspended in a curable adhesive.

In many embodiments, the region 302 and the other geometrically-separate regions have the same height and/or thickness. It may be appreciated that this is not required and, in some embodiments, certain regions may have a different height/thickness than other regions.

In many embodiments, the region 302 and the other geometrically-separate regions have the same shape. As shown the region 302 takes a substantially rounded or dome shape. It may be appreciated that this is not required and, in some embodiments, certain regions may have a different shape. For example, in some embodiments, the geometrically-separated regions of high conductive material can take the shape of, without limitation: a rectangle; a square; a rounded rectangle; a serpentine shape; a concentric set of shapes (e.g., concentric circles, concentric squares, and so on); a tessellated shape; and so on or any combination thereof.

The cross-section 300a also depicts an outer layer 306 is disposed over the region 302. As noted above, the outer layer 306 can be a passivation layer, an antireflective layer, an oleophobic layer, a hydrophobic layer, an encapsulation layer, or any other suitable layer. As illustrated, the outer layer 306 occupies space between the geometrically-separated regions, but this may not be required. For example, in some embodiments, a filler material can be disposed to occupy the space between the geometrically-separated regions. In these examples, the outer layer 306 can be disposed over the filler material.

As noted with respect to other embodiments described herein, the distance between the region 302 and adjacent regions of the high-conductivity material is typically small in order to facilitate charge carrier hopping from region to region. As a result of this construction, the average distance between individual regions of high-conductivity material can be correlated to resistivity of the layer. For example, the greater the average distance between regions, the more the resistivity of the layer increases.

Figure 3B:
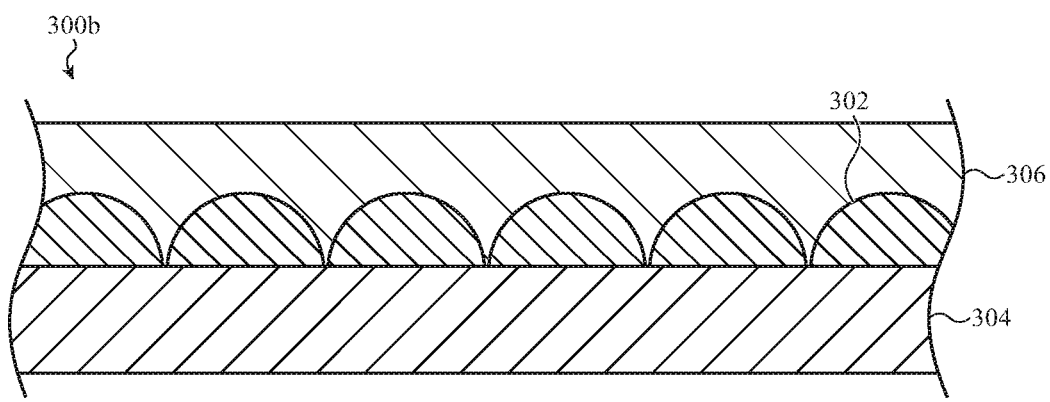
FIG. 3B depicts a cross-section view of a transparent high-resistivity layer formed from another example configuration of a cluster of geometrically-separated regions of high-conductivity material.

More particularly, the average distance between regions as shown in the detail view 300a is greater than the average distance between regions shown in the detail view 300b of FIG. 3B. As such, the sheet resistance of the transparent high-resistivity layer depicted in detail view 300a may be less than the sheet resistance of the high-resistivity layer depicted in detail view 300b. As another example, the, average distance between regions as shown in the detail view 300a is less than the average distance between regions shown in the detail view 300c of FIG. 3C. As such, the sheet resistance of the transparent high-resistivity layer depicted in detail view 300a may be less than the sheet resistance of the high-resistivity layer depicted in detail view 300c.

Figure 3C:
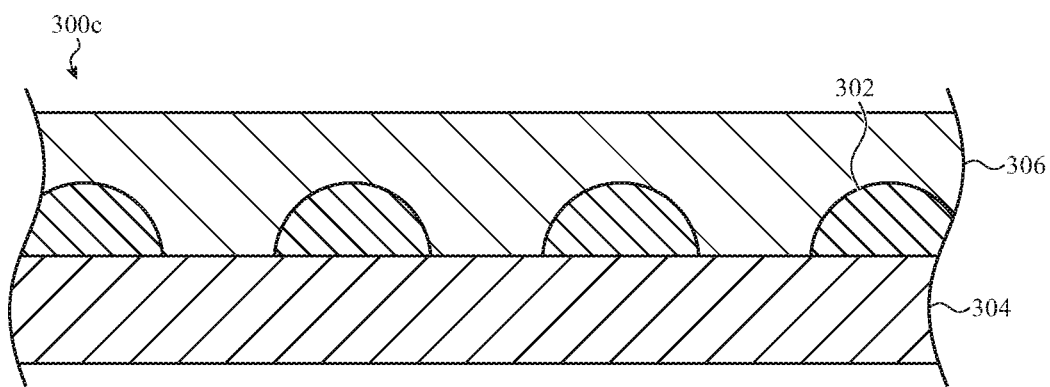
FIG. 3C depicts a cross-section view of a transparent high-resistivity layer formed from another example configuration of a cluster of geometrically-separated regions of high-conductivity material.
Figure 3D:
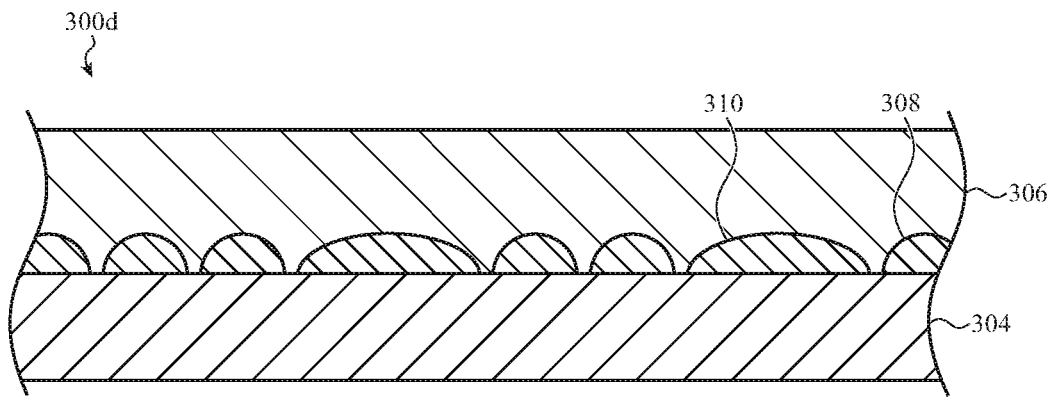
FIG. 3D depicts a cross-section view of a transparent high-resistivity layer formed from another example configuration of a cluster of geometrically-separated regions of high-conductivity material.
Figure 3E:
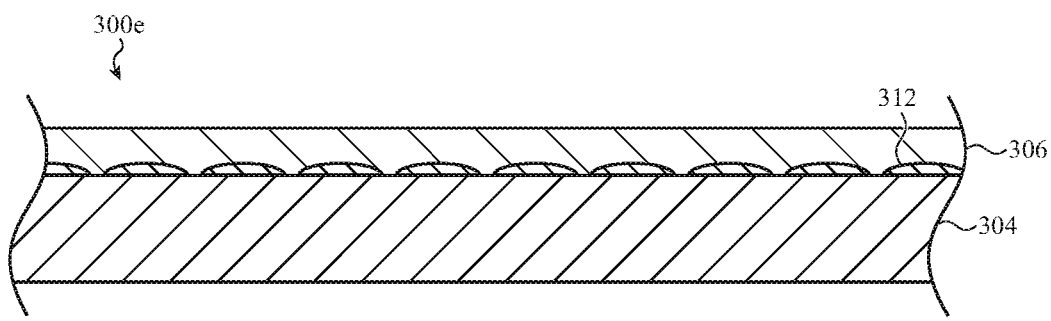
FIG. 3E depicts a cross-section view of a transparent high-resistivity layer formed from another example configuration of a cluster of geometrically-separated regions of high-conductivity material.

As noted above, in FIGS. 3A-3C, the region 302 is shown as taking a rounded shape. However this particular cross-sectional shape is not required and other embodiments can include region(s) have different shapes. For example, in some embodiments, different geometrically-separated regions can be shaped differently. FIG. 3D depicts a cross-section 300d showing differently-sized regions. In particular, a small region 308 can be positioned adjacent to a large region 310. In addition, in this embodiment, the regions have a smaller thickness than the regions depicted in FIGS. 3A-3C. In this cross-section, the outer layer 306 may be disposed to a greater thickness than the outer layer 306 as shown in FIGS. 3A-3C. However, this may not be required. For example, as shown in the cross-section 300e of FIG. 3D, the outer layer 306 can be disposed to a smaller thickness than the outer layer 306 depicted in FIGS. 3A-3D. In addition, as shown in the cross-section 300e, a region 312 can be disposed to be substantially flat. In some examples, the region 312 can take a flattened dome shape with rounded edges or sidewalls.

Figure 3F:
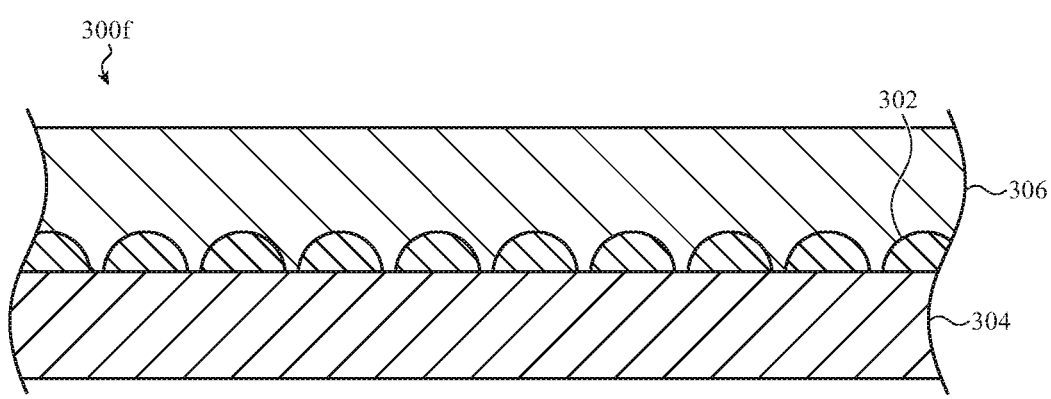
FIG. 3F depicts a cross-section view of a transparent high-resistivity layer formed from another example configuration of a cluster of geometrically-separated regions of high-conductivity material.

The foregoing description of the embodiment depicted in FIGS. 3A-3E, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof. For example, in some embodiments, the geometrically-separated regions of high-conductivity material can be disposed at a higher density than depicted. FIG. 3F depicts a cross-section 300f, showing a greater number of smaller regions than shown in the cross-section 300a of FIG. 3A.

Accordingly, it is understood that the foregoing and following descriptions of specific embodiments of a high-resistivity layer formed by geometrically separated regions of high-conductivity material are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4A:
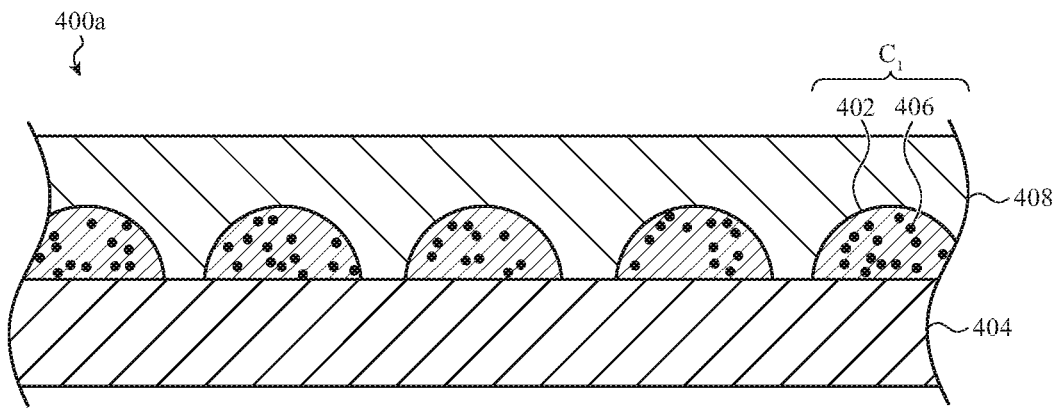
FIG. 4A depicts a cross-section view of a cluster of geometrically-separated regions of high-conductivity material having a selected impurity/doping concentration.
Figure 4B:
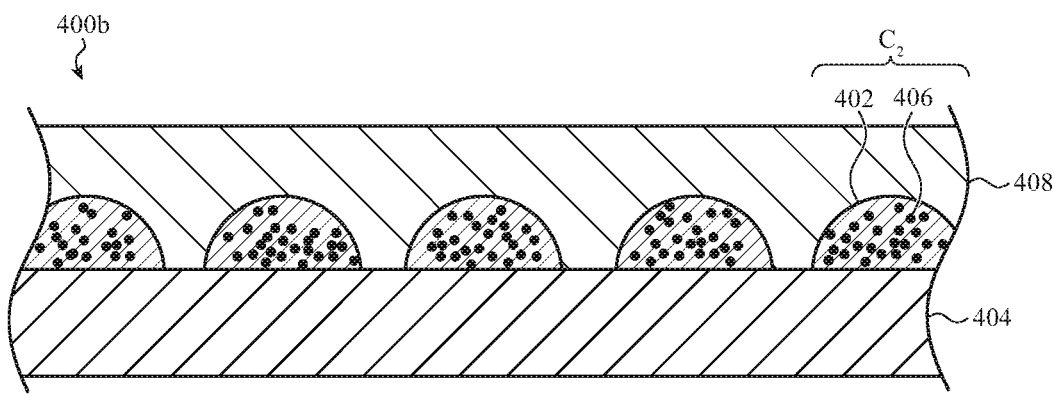
FIG. 4B depicts a cross-section view of a cluster of geometrically-separated regions of high-conductivity material having a selected impurity/doping concentration.
Figure 4C:
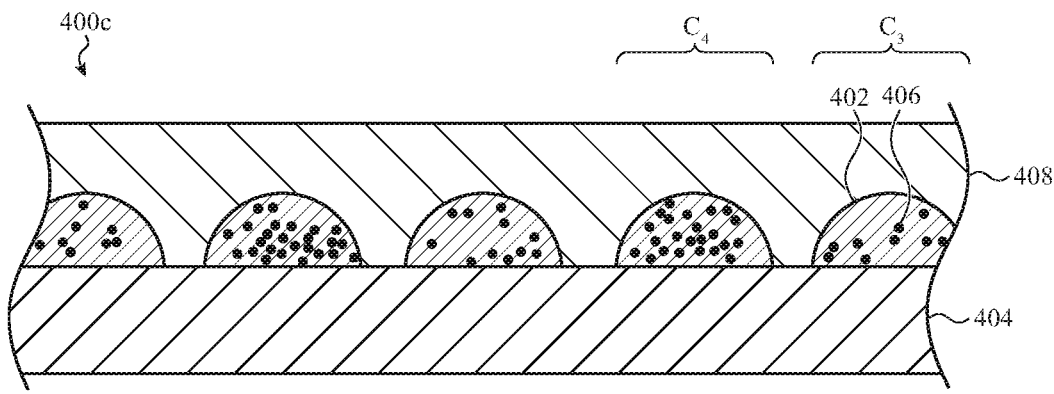
FIG. 4C depicts a cross-section view of a cluster of geometrically-separated regions of high-conductivity material having multiple selected impurity/doping concentrations.

In other embodiments, a transparent high-resistivity layer can be formed in another manner. For example, generally and broadly, FIGS. 4A-4C depict various detail views of example cross-sections of a transparent high-resistivity layer. In general, these embodiments depict a transparent high-resistivity formed from a number or cluster of geometrically-separated regions of material having different concentrations of high-conductivity dopant. As noted above, the distance between individual regions is typically small in order to facilitate charge carrier hopping from region to region, facilitating conduction across the layer. As a result of this construction, the average distance between individual regions can be correlated to resistivity of the layer. For example, the greater the average distance between regions, the more the resistivity of the layer increases. Similarly, the greater the concentration of high-conductivity of dopant, the more the resistivity of the layer decreases.

In particular, FIG. 4A depicts a detail view 400a of a transparent high-resistivity layer defined by a cluster of geometrically-separated regions, one of which is identified as the region 402. As with the embodiment described in reference to FIGS. 2A-2B and 3A-3C, the region 402 can be disposed onto, formed onto, or otherwise attached to a dielectric layer 404.

The region 402—along with the other geometrically-separated regions of high-conductivity and optically transparent material—can be formed in a number of suitable ways from a number of suitable materials or combinations of materials. In one embodiment, the region 402 is formed from a low conductivity body doped with a high-conductivity dopant 406. The high-conductivity dopant 406 can be formed from any number of suitable materials such as, but not limited to: a transparent metal oxide, such as indium tin oxide; a metal nanowire, such as a silver nanowire; and so on. In the illustrated embodiment, the high-conductivity dopant 406 is disposed to a selected concentration $C_1$.

As with the embodiments described in reference to FIGS. 3A-3F, in many embodiments, the region 402 and the other geometrically-separate regions have the same height and/or thickness. It may be appreciated that this is not required and, in some embodiments, certain regions may have a different height/thickness than other regions. Similarly, the region 402 and the other geometrically-separate regions have the same shape and/or dopant concentration. As shown the region 402 takes a substantially rounded shape. It may be appreciated that this is not required and, in some embodiments, certain regions may have a different shape. For example, in some embodiments, the geometrically-separated regions of high conductive material can take the shape of, without limitation: a rectangle; a square; a rounded rectangle; a serpentine shape; a concentric set of shapes (e.g., concentric circles, concentric squares, and so on); a tessellated shape; and so on or any combination thereof.

As with other embodiments described herein, the detail view 400a also depicts an outer layer 408 is disposed over the region 402. As noted above, the outer layer 408 can be a passivation layer, an antireflective layer, an oleophobic layer, a hydrophobic layer, an encapsulation layer, or any other suitable layer. As illustrated, the outer layer 408 occupies space between the geometrically-separated regions, but this may not be required. For example, in some embodiments, a filler material can be disposed to occupy the space between the geometrically-separated regions. In these examples, the outer layer 408 can be disposed over the filler material.

As noted with respect to other embodiments described herein, the distance between the region 402 and adjacent regions is typically small in order to facilitate charge carrier hopping from region to region. As a result of this construction, the average distance between individual regions can be correlated to resistivity of the layer. For example, the greater the average distance between regions, the more the resistivity of the layer increases.

In other embodiments, other concentrations of dopant can be used. For example, as shown in the cross-section 400b of FIG. 4B the high-conductivity dopant 406 can be disposed to a higher concentration $C_2$. In still further embodiments, different regions can have different concentrations, such as shown in cross-section 400c of FIG. 4C.

The foregoing description of the embodiment depicted in FIGS. 4A-4F, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Accordingly, it is understood that the foregoing and following descriptions of specific embodiments of a high-resistivity layer formed by geometrically separated regions of low-conductivity material doped with high-conductivity material are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

In still further embodiments, as noted above, a transparent high-resistivity layer can be formed from a substantially contiguous layer (or more than one layer) of material. The layer can be formed from a single material or multiple materials. In particular, FIGS. 5A-6D depict various configurations of a transparent high-resistivity layer formed from a substantially contiguous layer. In particular, FIG. 5A depicts a cross-section 500a including a dielectric layer 602, a transparent high-resistivity layer 504, and an outer layer 506.

As described with respect to other embodiments herein, the dielectric layer 502 can be formed from a single layer or multiple layers, and can be formed from, without limitation: glass, plastic, acrylic, polymer, ceramic, and so on. In some cases, the dielectric layer 502 also serves as an outer layer of a display, such as the display 104 shown in FIG. 1A. In still further examples, the dielectric layer 502 can be a functional layer of a display, such as an encapsulation layer of an organic light emitting diode display or a polarizer layer of a liquid crystal display.

Also as described with respect to other embodiments herein, the outer layer 506 can be a passivation layer, an encapsulation layer, a protective layer, and so on, and can be made from any number of suitable materials. In some cases, the outer layer 506 may not be required.

In this embodiment, the transparent high-resistivity layer 504 can be formed from a low-conductivity material doped with a high conductivity dopant, such as metal nanowire or a transparent conductive oxide. As noted above, the thickness of the transparent high-resistivity layer 504 may be related to the resistivity of the layer. Accordingly, different embodiments may include a transparent high-resistivity layer 504 of different thicknesses. Generally, a thinner layer may be associated with higher resistivity, but this may not be required of all embodiments.

In further examples, a transparent high-resistivity layer can be implemented with one or more sublayers of conductive or resistive material. For example, FIG. 5B depicts a cross-section 500b that, like the cross-section 500a, includes a dielectric layer 502, a transparent high-resistivity layer 504, and an (optional) outer layer 506. In this example, the transparent high-resistivity layer 504 includes three distinct sublayers. A first high-conductive sublayer 508 and a second high-conductivity sublayer 510 can be disposed on opposite sides of a low-conductivity sublayer 512. Suitable materials for the high-conductivity sublayers 508, 510 include, but are not limited to, metal oxides. Suitable materials for the low-conductivity sublayer 512 include, but is not limited to, low-conductivity oxides such as aluminum oxide. Although only three sublayers are shown, it is appreciated that any suitable number of sublayers may be included.

In still further embodiments, a transparent high-resistivity layer can be implemented with a high number of sublayers. For example, FIG. 5C depicts a cross-section 500c that includes a transparent high-resistivity layer 504 implemented with numerous sublayers of material, each having a selected conductivity/resistivity. In some examples, the sublayers can alternate from a first conductivity to a second conductivity. In other examples, the sublayers can progressively increase or decrease in conductivity to define a gradient conductivity. In still further examples, each sublayer can have a selected conductivity different from the conductivities of adjacent or other sublayers. The foregoing examples are not exhaustive; it may be appreciated that any suitable layering configuration may be appropriate for a particular implementation.

In still further embodiments, a substantially contiguous layer of material defining a transparent high-resistivity layer can be formed from a low-conductivity material doped with a high-conductivity dopant. In other examples, a high-conductivity material can be doped with a low-conductivity dopant. For simplicity of description, the embodiments that follow reference a low-conductivity material doped with a high-conductivity dopant, but it is appreciated that this is merely an example.

Figure 6A:
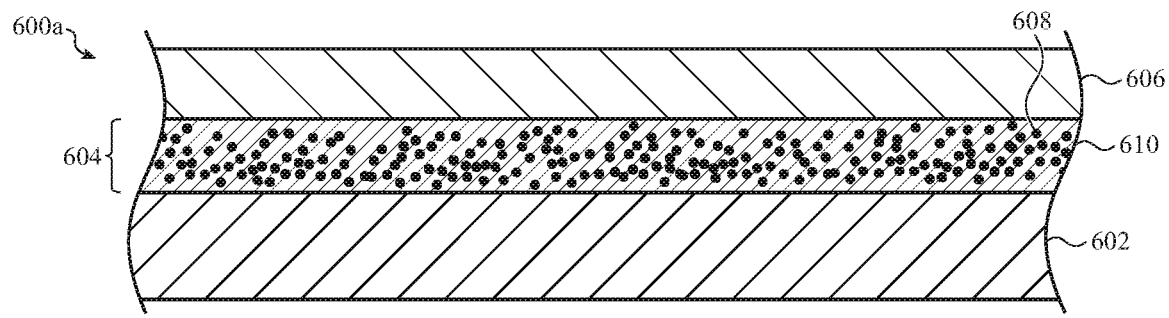
FIG. 6A depicts a cross-section view of a layer of high-conductivity material having a selected impurity/doping concentration.

For example, FIG. 6A depicts a cross-section 600a that includes a dielectric layer 602, a transparent high-resistivity layer 604, and an outer layer 606. In this example, the transparent high-resistivity layer 604 includes a body 608 and a dopant 610. The dopant 610 can be disposed in a substantially uniform manner throughout the body 608 so as to define a substantially consistent sheet resistance for the transparent high-resistivity layer 604.

Figure 6B:
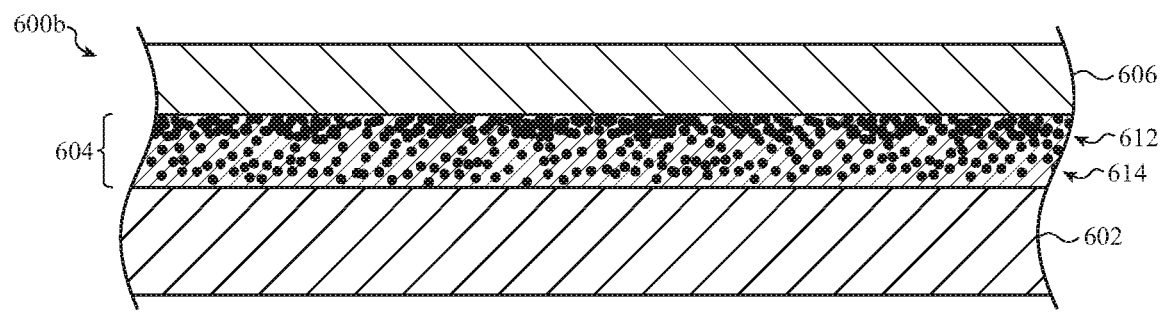
FIG. 6B depicts a cross-section view of a layer of high-conductivity material having a gradient impurity/doping concentration.

In other cases, a dopant gradient can be used. For example, FIG. 6B depicts a cross-section 600b in which the transparent high-resistivity layer 604 includes multiple dopant concentrations defining a gradient through the thickness of the transparent high-resistivity layer 604. In particular, a first side of the transparent high-resistivity layer 604 abutting the outer layer 606 can have a first dopant concentration 612 than a second side of the transparent high-resistivity layer 604 abutting the dielectric layer 602 can have a second dopant concentration 614.

Figure 6C:
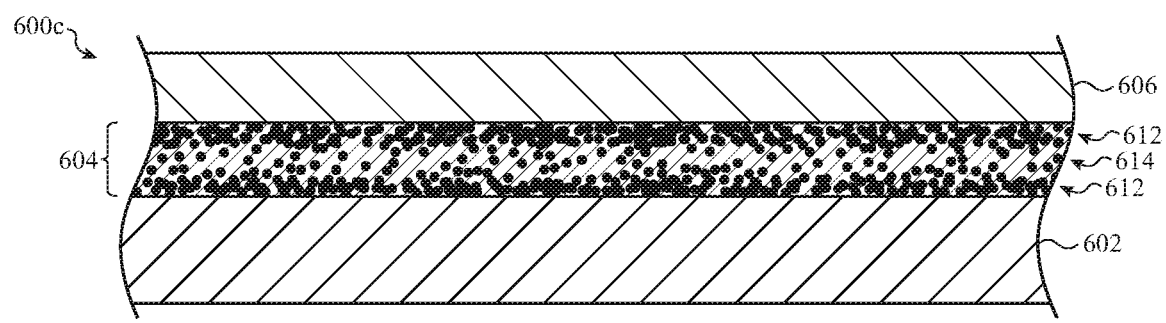
FIG. 6C depicts a cross-section view of a layer of high-conductivity material having a surface depth-dependent impurity/doping concentration.

In still further embodiments, horizontal or vertical dopant bands can be used. For example, FIG. 6C depicts a cross-section 600c in which the transparent high-resistivity layer 604 includes multiple dopant concentration bands generally horizontally aligned. In particular, two bands of a first dopant concentration 612 can be positioned parallel to a third band of a second dopant concentration 614. In other cases, dopant concentration bands can be oriented along a different direction than depicted in FIG. 6C, such as along an angle, following a zig-zag pattern, vertically-aligned, and so on.

Figure 6D:
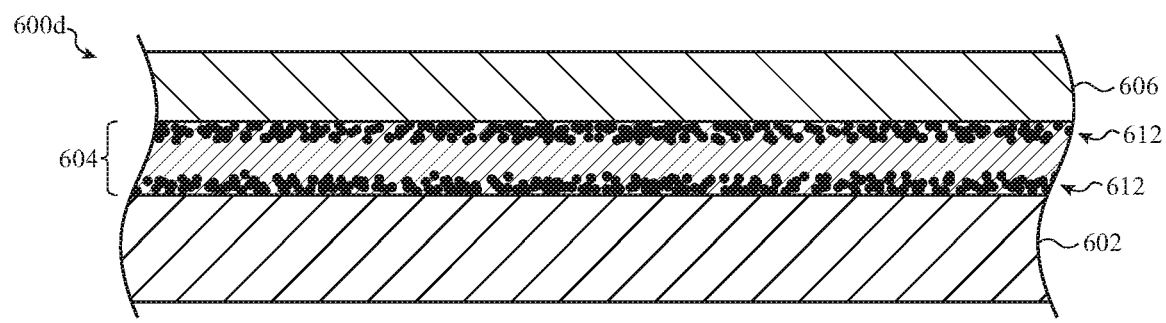
FIG. 6D depicts a cross-section view of a layer of high-conductivity material having multiple discrete regions of selected impurity/doping concentrations.

In still further embodiments, dopant bands can separated by dopant-free regions of the body of the transparent high-resistivity layer 604. For example, FIG. 6D depicts a cross-section 600d in which the transparent high-resistivity layer 604 includes two dopant bands having a first dopant concentration 612 separated by a dopant-free region (also referred to as an "un-doped" region) of the body of the transparent high-resistivity layer 604. 0

The foregoing description of the embodiment depicted in FIGS. 5A-6C, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Accordingly, it is understood that the foregoing and following descriptions of specific embodiments of a high-resistivity layer formed by low-conductivity material doped with high-conductivity material (or the reverse) are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 7:
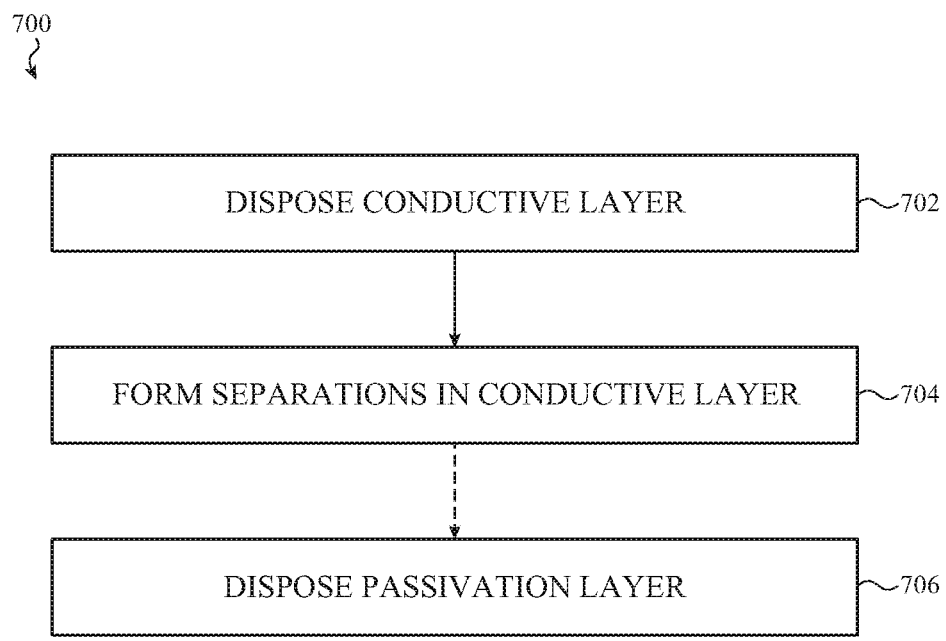
FIG. 7 is a flowchart depicting example operations of a method of forming a transparent high-resistivity layer, such as described herein.
Figure 8:
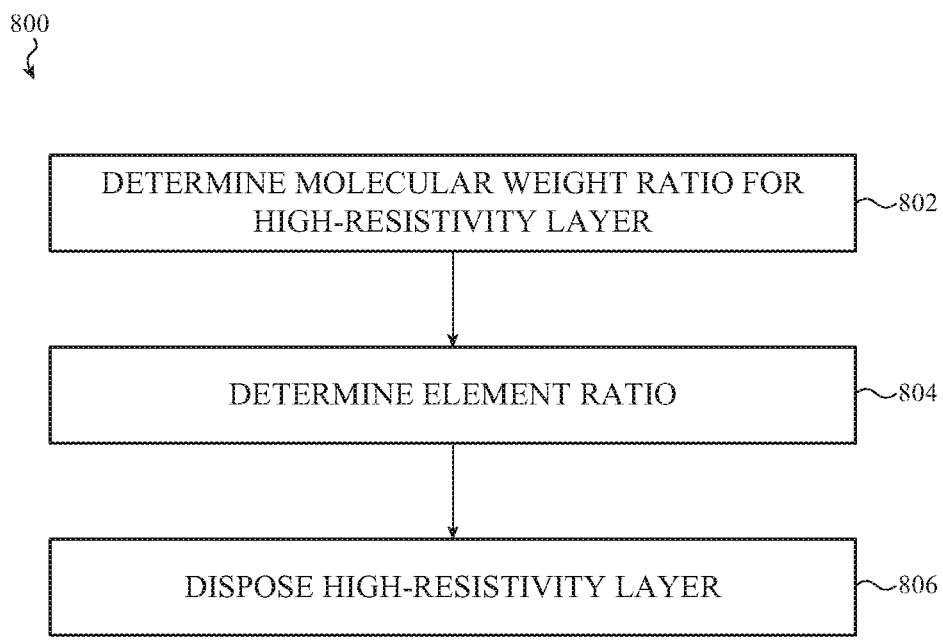
FIG. 8 is a flowchart depicting example operations of a method of forming a transparent high-resistivity layer with selected impurity/doping concentrations, such as described herein.
Figure 9:
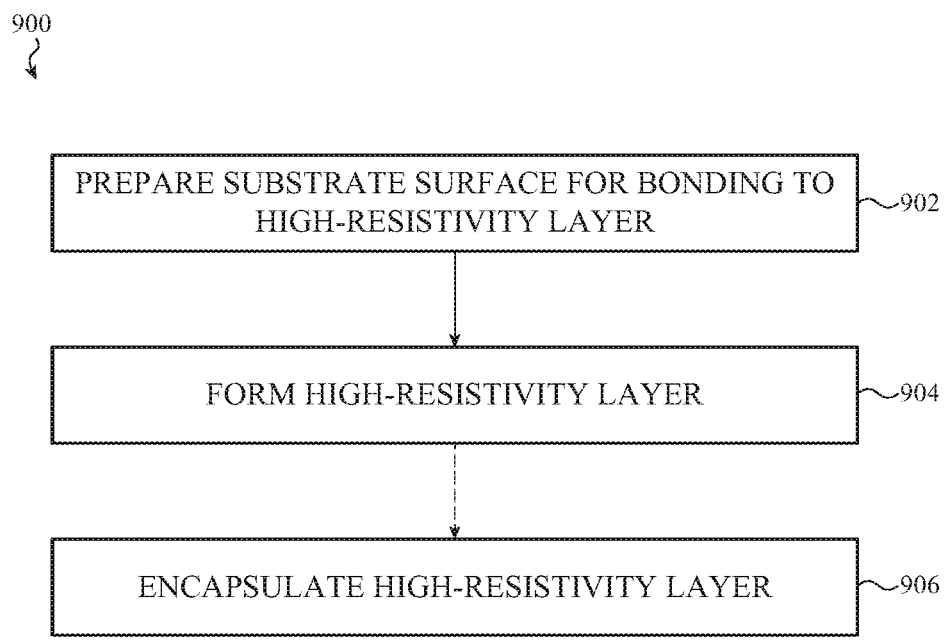
FIG. 9 is a flowchart depicting example operations of a method of forming a transparent high-resistivity layer, such as described herein.

FIGS. 7-9 depict flow charts of various methods of forming a transparent high-resistivity layer. In particular, FIG. 7 depicts example operations of a method of forming a transparent high-resistivity layer. The method 700 begins at operation 702 in which a conductive layer is disposed on a substrate. The method 700 also includes operation 704 in which one or more separations are formed in the conductive layer to define a number of geometrically-separated regions of conductive material. The method 700 optionally includes operation 706 in which a passivation layer (e.g., outer layer) is disposed over the geometrically-separated regions of conductive material.

FIG. 8 depicts example operations of a method of determining a dopant concentration for a transparent high-resistivity layer. The method 800 beings at operation 802 in which a molecular weight ratio between a high-conductivity material and an impurity/dopant material is selected. In one example, the impurity material is oxygen and the high-conductivity material is a metal oxide. The method 800 also includes operation 804 in which a deposition pattern is determined. The method 800 also includes operation 806 in which the high-resistivity layer is disposed onto a substrate.

FIG. 9 depicts example operations of a method of forming a high-resistivity layer. The method 900 includes operation 902 in which a substrate surface is prepare for bonding. The preparation operation can include without limitation: cleaning; chemical etching; mechanical etching; laser etching; disposing an intermediate bonding layer; electrically charging; and so on. The method 900 also includes operation 904 in which a high-resistivity layer is formed on the prepared surface. The method 900 also optionally includes operation 906 in which the high-resistivity layer is encapsulated with a protective material.

The foregoing description of the embodiment depicted in FIGS. 7-9, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of a transparent high-resistivity layer are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

In addition, one may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
    an interface surface configured to receive a user input;
    a high-resistivity layer at least partially below the interface surface, the high-resistivity layer comprising a number of geometrically-separated regions of high-conductivity material; and
    a capacitive input sensor positioned below the interface surface and below the high-resistivity layer; wherein
    the capacitive input sensor is configured to detect the user input through the high-resistivity layer; and
    the capacitive input sensor is ground-shifted to drive the high-resistivity layer to a high voltage.

2. The electronic device of claim 1, wherein the high-resistivity layer exhibits optical transmittance greater than 50% in the wavelength band between, and including, 300nm and 700nm.

3. The electronic device of claim 2, wherein the high-resistivity layer exhibits optical transmittance greater than 80% in the wavelength band between, and including, 300 nm and 700 nm.

4. The electronic device of claim 1, wherein at least one geometrically-separated region comprises a body having a dome shape.

5. The electronic device of claim 4, wherein the body is formed from a low-conductivity material and is doped to a selected doping concentration with a high-conductivity material.

6. The electronic device of claim 1, wherein the high-resistivity layer is formed, at least in part, from a silicon oxide.

7. The electronic device of claim 6, wherein the high-resistivity layer is formed from a combination of silicon dioxide and tin dioxide.

8. The electronic device of claim 1, wherein the interface surface is defined by an outer surface of the high-resistivity layer.

9. The electronic device of claim 1, wherein each geometrically-separated region comprises a body having a flattened dome shape.

* * * * *